(12) United States Patent
Kim et al.

(10) Patent No.: US 7,530,613 B2
(45) Date of Patent: May 12, 2009

(54) APPARATUS FOR CONNECTING AND DISCONNECTING TWO OBJECTS

(75) Inventors: Heung-Youl Kim, Daejeon (KR);
Yong-Bum Jun, Daejeon (KR)

(73) Assignee: Agency for Defense Development (KR)

( * ) Notice: Subject to any disclaimer, the term of this patent is extended or adjusted under 35 U.S.C. 154(b) by 0 days.

(21) Appl. No.: 11/388,055

(22) Filed: Mar. 22, 2006

(65) Prior Publication Data

US 2007/0186701 A1    Aug. 16, 2007

(51) Int. Cl.
*F15B 15/19* (2006.01)
*B63B 23/58* (2006.01)

(52) U.S. Cl. .............. 294/82.24; 294/82.31; 294/82.32; 403/2; 91/5; 92/24

(58) Field of Classification Search .......... 403/2, 403/321, 322.1, 322.3; 294/82.24, 82.31, 294/82.32, 86.17, 86.18; 89/1.14, 1.57; 91/5; 92/24
See application file for complete search history.

(56) References Cited

U.S. PATENT DOCUMENTS

| | | | | |
|---|---|---|---|---|
| 3,152,829 | A | * | 10/1964 | Steele, Sr. ................ 294/86.18 |
| 3,408,890 | A | * | 11/1968 | Bochman, Jr. |
| 3,437,370 | A | * | 4/1969 | Bochman, Jr. et al. ... 294/86.17 |
| 3,597,919 | A | * | 8/1971 | Lilly |
| 3,666,216 | A | * | 5/1972 | Nagy et al. ................ 294/82.3 |
| 3,810,671 | A | * | 5/1974 | Jeffery ..................... 294/82.32 |
| 3,910,154 | A | * | 10/1975 | Gardner ...................... 89/1.14 |
| 4,244,386 | A | * | 1/1981 | Hardesty |
| 4,810,017 | A | * | 3/1989 | Knak et al. .............. 294/82.32 |
| 4,929,135 | A | * | 5/1990 | Delarue et al. |
| 5,046,395 | A | * | 9/1991 | Graves et al. ................ 89/1.14 |
| 5,131,705 | A | * | 7/1992 | Gluck et al. ............. 294/82.32 |
| 5,312,147 | A | * | 5/1994 | Rudoy et al. ............. 294/82.32 |
| 5,900,579 | A | * | 5/1999 | Hutter et al. |
| 6,126,115 | A | * | 10/2000 | Carrier et al. ............ 294/82.24 |
| 6,467,987 | B1 | * | 10/2002 | Larsen et al. ............... 403/321 |
| 6,662,702 | B1 | * | 12/2003 | Vidot et al. ................. 89/1.14 |
| 7,284,773 | B2 | * | 10/2007 | Curry et al. |
| 7,437,872 | B2 | * | 10/2008 | Kim et al. ...................... 92/24 |

FOREIGN PATENT DOCUMENTS

| FR | 1437541 | | * | 5/1966 |
|---|---|---|---|---|
| FR | 2282580 | A | * | 4/1976 |
| JP | 2004051042 | A | * | 2/2004 |

* cited by examiner

*Primary Examiner*—Daniel P Stodola
*Assistant Examiner*—Ernesto Garcia
(74) *Attorney, Agent, or Firm*—Ostrolenk, Faber, Gerb & Soffen, LLP

(57) ABSTRACT

An apparatus for connecting and disconnecting two objects comprises: a housing formed as a hollow type, and having one closed end to which a first object is connected and another opened end; a coupling portion mounted in the housing so as to be movable in an axial direction of the housing, and to which a second object is connected; a clamping portion coupled to the housing for clamping the coupling portion; a cylinder disposed in the housing for pressurizing the clamping portion so that a clamped state of the coupling portion by the clamping portion can be maintained; and a gas generator integrally coupled to an outer surface of the housing so as to be in communication with inside of the housing for generating gas of a high pressure thereby releasing a clamped state of the coupling portion and separating the coupling portion from the housing. Two objects are easily connected or disconnected to/from each other by the simple construction.

6 Claims, 3 Drawing Sheets

APPARATUS FOR CONNECTING AND DISCONNECTING TWO OBJECTS

BACKGROUND OF THE INVENTION

1. Field of the Invention

The present invention relates to an apparatus for connecting and disconnecting two objects, and more particularly, to an apparatus for connecting and disconnecting two objects capable of maintaining a coupled state between two objects and then separating the two objects to a safety distance.

2. Description of the Background Art

A device such as an explosive bolt has been used in many fields in order to instantaneously separate two objects coupled to each other to a safety distance.

The explosive bolt fills its body up with powder in order to cut it by explosive force and separate those two from each other.

As a system for separating a guided missile from a launcher platform in land or on ship, the explosive bolt is used. A guided missile is connected to a launcher platform by an explosive bolt, and is instantaneously separated from the launcher platform.

The explosive bolt connects two objects and disconnects the two objects. In a guided weapon system, the explosive bolt is used in order to simply separate a guided missile from a launcher platform. The guided missile separated from the launcher platform is compulsorily moved to a certain safety distance by a thrust of a propellant.

Since the explosive bolt simply separates two objects coupled to each other from each other, an additional device for compulsorily moving the objects to a safety distance is required.

As the additional device, a gas generator is generally used. However, in order to use a pressure of the gas generator, a certain sealing space is necessary and thus a space efficiency is degraded.

Furthermore, in order to operate the gas generator and the explosive bolt, each power line has to be designed and thus an entire system becomes complicated thereby to degrade a reliability of the entire system.

Accordingly, an apparatus for connecting and disconnecting two objects capable of separating two objects from each other and moving the objects to a certain distance without degrading a space efficiency and a reliability is being required.

Furthermore, an apparatus for connecting and disconnecting two objects that can be easily disassembled and examined by a user's naked eyes is being required in order to certify whether components inside the apparatus are mal-operated or not.

BRIEF DESCRIPTION OF THE INVENTION

Therefore, an object of the present invention is to provide an apparatus for connecting and disconnecting two objects capable of easily separating two objects coupled to each other to a safety distance and facilitating a handling thereof.

To achieve these and other advantages and in accordance with the purpose of the present invention, as embodied and broadly described herein, there is provided an apparatus for connecting and disconnecting two objects, comprising: a housing; a coupling portion; a clamping portion; a cylinder; and a gas generator.

A first object is connected to the housing, and a second object is connected to a coupling portion insertion-fixed to the housing. Accordingly, as long as the housing and the coupling portion are coupled to each other, the first object and the second object are connected to each other. The clamping portion is coupled to inside of the housing, and fixes the coupling portion into the housing. The cylinder maintains a fixed state (a clamped state) of the coupling portion by the clamping portion. The gas generator is mounted on an outer circumferential surface of the housing so as to be in communication with an inner space of the housing, and emits gas of a high pressure into the housing at the time of being operated. As the clamped state of the coupling portion by the clamping portion is released by the pressure of a high pressure, the coupling portion is separated from the inside of the housing. As the result, the first object connected to the housing is separated from the second object connected to the coupling portion.

The clamping portion comprises a jaw arranged in the housing and having an end locked by a clamping groove of the coupling portion, and a supporting rod for rotatably mounting the jaw so that the jaw can be widened or narrowed for clamping of the coupling portion.

The apparatus for connecting and disconnecting two objects can further comprise a fixing portion for fixing a cylinder to the housing and firmly maintaining a clamped state of the coupling portion by the cylinder. The fixing portion can be implemented as a tension bolt penetrating a closed end of the housing thus to be coupled to one side of the cylinder. The tension bolt becomes tensile when the gas generator is operated thus breaking, thereby moving the cylinder in an axial direction of the housing and releasing a clamped state of the clamping portion.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Hereinafter, an apparatus for connecting and disconnecting two objects according to a first embodiment of the present invention will be explained with reference to the attached drawings.

Figure 1:
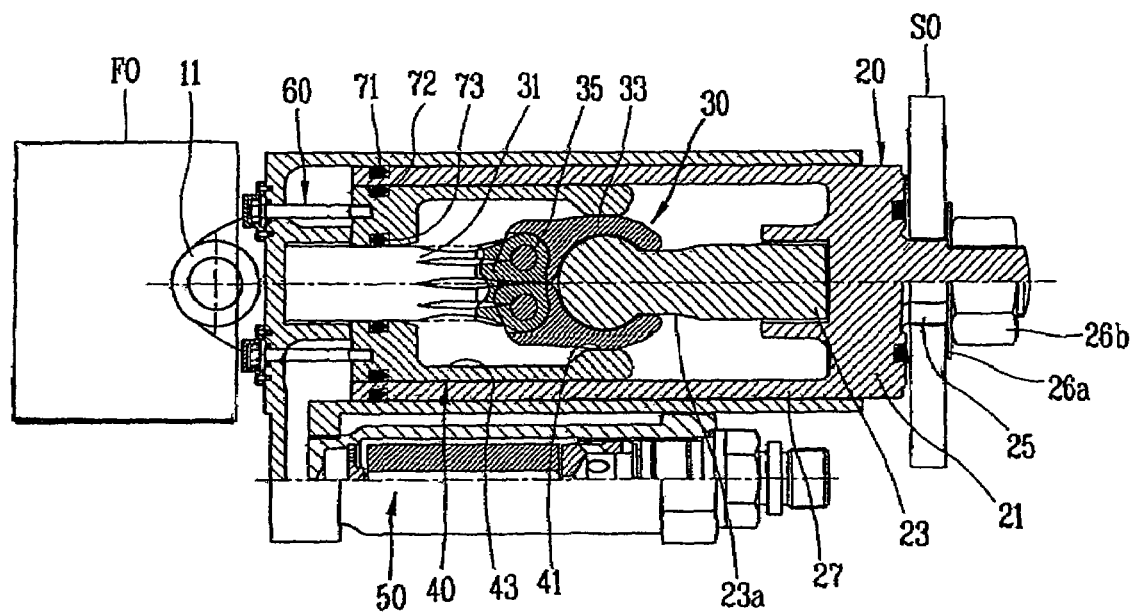
FIG. 1 is a sectional view showing an inner structure of an apparatus for connecting and disconnecting two objects according to a first embodiment of the present invention.

FIG. 1 is a sectional view showing an inner structure of an apparatus for connecting and disconnecting two objects, designated first and second objects and shown in all the Figures in dotted and dashed lines, as FO and SO, respectively, according to a first embodiment of the present invention.

As shown, the apparatus for connecting and disconnecting two objects (FO and SO) comprises a housing 10, a coupling portion 20, a clamping portion 30, a cylinder 40, and a gas generator 50.

The housing 10 is formed as a hollow type extending in a longitudinal direction, and has one closed end and another opened end. A connection portion 11 is protruding at an outer surface of the closed end of the housing 10. A first FO shown in dotted and dashed lines, is connected to the connection portion 11.

The coupling portion 20 is inserted into the housing 10 through the opened end of the housing 10, and then is fixed into the housing 10.

The coupling portion 20 comprises a coupling body 21, a coupling rod 23 extending towards the inner space of the housing 10 from the coupling body 21, and a coupling protrusion 25 protruding from the coupling body 21 in an opposite direction to the coupling rod 23.

The coupling rod 23 is protruding from the coupling body 21 as a unit, is coupled to the coupling body 21, or is extended in a longitudinal direction. A free end of the coupling rod 23 has a spherical shape, and a clamping groove 23a is formed in a circumferential direction of the coupling rod 23. The coupling protrusion 25 for connecting the coupling body 21 to a second object (not shown) is, for example, connected to the coupling protrusion 25 by a screw. The coupling protrusion 25 is provided with a washer 26a and a nut 26b in order to couple the second object thereto.

A coupling cylinder 27 extending towards the closed end of the housing 10 so as to be positioned between an inner circumference of the housing 10 and an outer circumference of the cylinder 40 as a cavity form is provided at the coupling body 21. The coupling cylinder 27 seals a space between the housing 10 and the cylinder 40 and receives a force by a gas pressure when the gas generator 50 is operated, thereby moving the coupling portion 20 outside the housing 10.

The clamping portion 30 comprises a supporting rod 31 protruding from the closed end of the housing 10 towards the inner space of the housing 10 in an axial direction of the housing 10, and a jaw 33 rotatably coupled to a free end of the supporting rod 31. The supporting rod 31 is protruding from the closed end of the housing 10 as a unit, or is coupled to the housing 10 by a screw. The jaw 33 is coupled to the free end of the supporting rod 31 by a rotation pin 35, and is rotated to be widened or narrowed in order to cover and fix the coupling rod 23.

The cylinder 40 has a cavity form to cover the supporting rod 31 and the jaw 33. A pressurizing portion 41 for pressurizing the jaw 33 not to be widened under a state that the jaw covers and fixes the coupling rod 23 is protruding from an inner circumference of the cylinder 40. Also, a releasing portion 43 for releasing a clamped state of the coupling rod 23 by providing a space where the jaw is rotated to be widened as the cylinder 40 moves towards the opened end of the housing 10 by a high pressure of gas emitted from the gas generator 50 is formed at an inner circumference of the cylinder 40. The releasing portion 43 has a radius larger than a radius of the pressurizing portion 41, and has a step more concaved than the pressurizing portion 41.

The gas generator 50 is mounted on an outer circumference of the housing 10 so as to be in communication with the inner space of the housing 10, and emits gas of a high pressure to the inner space of the housing 10. The gas generator 50 is electrically connected to a control unit (not shown) for controlling the gas generator 50.

The apparatus for connecting and disconnecting two objects can further comprise a fixing portion 60 for fixing the cylinder 40 into the housing 10.

The fixing portion 60 is implemented as a tension bolt penetrating the closed end of the housing 10 thus to be coupled to one side of the cylinder 40. The fixing portion 60 fixes the cylinder 40 under a state that the pressurizing portion 41 of the cylinder 40 pressurizes the jaw 33 for clamping the coupling rod 23.

A sealing member, for example, an O-ring 73 is coupled between the supporting rod 31 and the cylinder 40 or O-ring 72 between the cylinder 40 and the coupling cylinder 27, thereby sealing therebetween. O-ring 71 is on the outer side of cylinder 27.

An assembly process and a disassembly process of the apparatus for connecting and disconnecting two objects according to the present invention will be explained as follows.

The supporting rod 31 of the clamping portion 30 is penetratingly-inserted into the cavity of the cylinder 40 so that the jaw 33 can be arranged in the cylinder 40.

Then, the coupling portion 20 is inserted into the cavity of the cylinder 40 so that the free end of the coupling rod 23 can be covered by the jaw 33.

Then, the cylinder 40 is moved in a longitudinal direction of the supporting rod 31 so that the pressurizing portion 41 of the cylinder 40 can pressurize the jaw 33 that covers the coupling rod 23.

The assembly constituted with the coupling portion 20, the clamping portion 30, and the cylinder 40 is inserted into the housing 10 through the opened end of the housing 10. Then, the supporting rod 31 is coupled to a concaved portion of the housing 10 where a female screw (not shown) is formed by a male screw (not shown) formed on the outer circumference of the supporting rod 31.

Then, the tension bolt 60 is inserted into the housing 10 through a screw groove (not shown) formed at the closed end of the housing 10 and then is rotated, thereby connecting the housing 10 and the cylinder 40 to each other. The O-ring is fitted into each component before the components are coupled to each other.

Finally, the gas generator 50 mounted at the housing 10 is electrically connected to the control unit so as to be in a wait state for an operation. The first object FO is connected to the housing 10 and the second object SO is connected to the coupling portion 20, and the housing 10 and the coupling portion 20 are coupled to each other.

The disassembly process of the apparatus for connecting and disconnecting two objects FO and SO is implemented in an opposite way to the assembly process, and thus its detail explanation will be omitted. Since the tension bolt 60 is easily disassembled, the apparatus for connecting and disconnecting two objects can be checked by a user's naked eyes after being operated for a long time by disassembling the tension bolt 60.

The operation of the apparatus for connecting and disconnecting two objects FO and SO according to a first embodiment of the present invention will be explained with reference to FIGS. 2 to 5.

Figure 2:
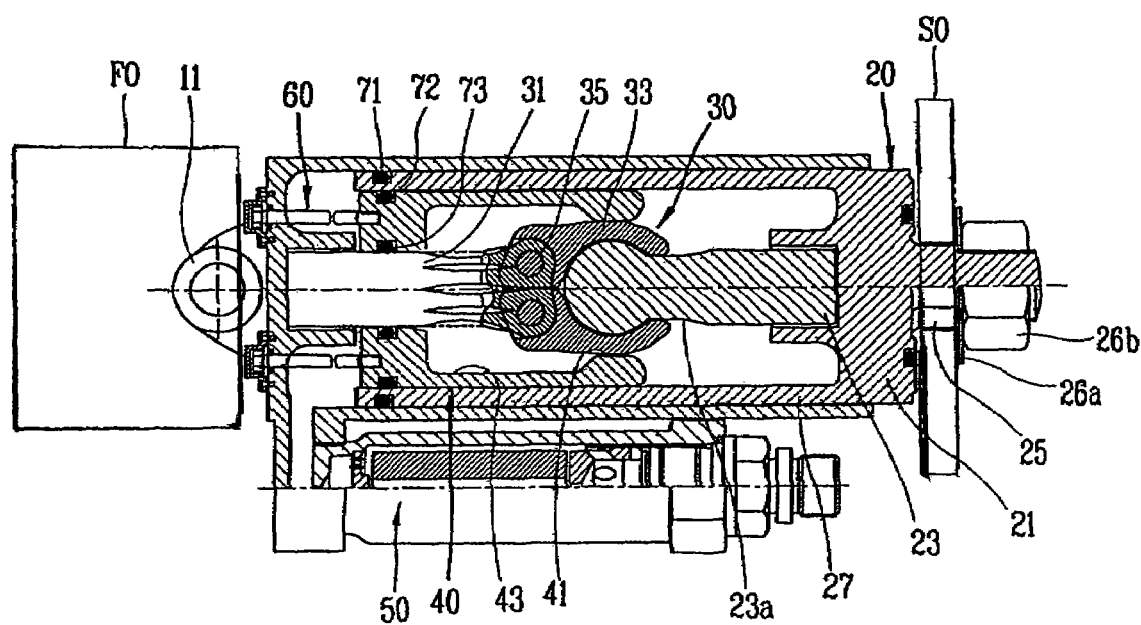
FIG. 2 is a sectional view of the apparatus showing a state after a tension bolt is broken by a pressure of gas emitted from a gas generator.

FIG. 2 is a sectional view of the apparatus showing a state after the tension bolt is broken by a pressure of gas emitted from the gas generator.

As shown, when the gas generator 50 is operated by the control unit, gas of a high pressure emitted from the gas generator 50 flows into the housing 10.

As the gas of a high pressure flows (F) into the housing 10, the cylinder 40 is moved towards the opened end of the housing 10. Also, a tension force is applied to the tension bolt 60 respectively connected to the housing 10 and the cylinder 40.

As a tension force is applied to the tension bolt 60, the tension bolt 60 has a stress concentrated at a notched portion thereof thus breaking. As the result, a fixed state of the cylinder 40 to the housing 10 is released.

Figure 3:
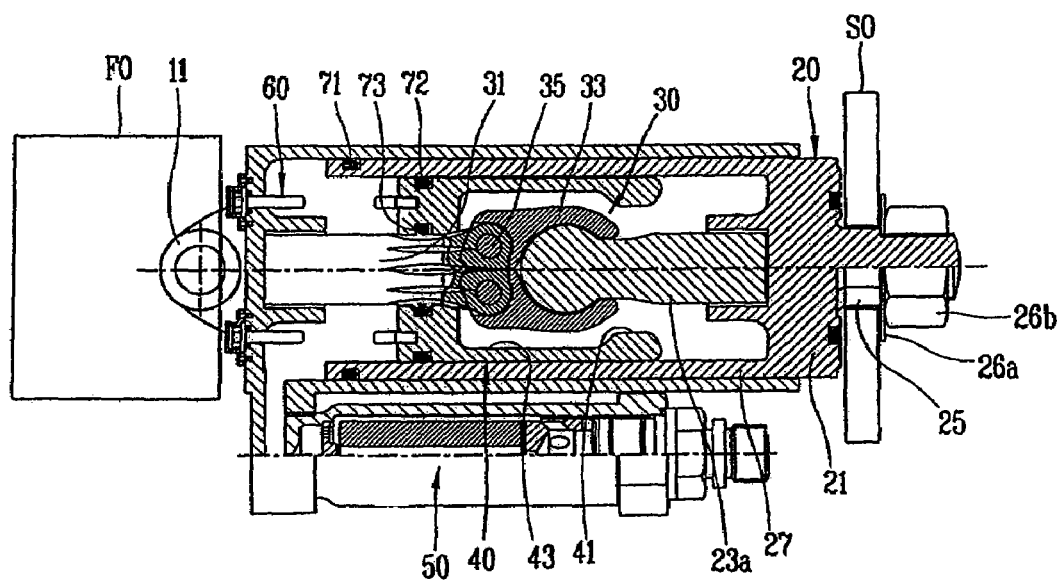
FIG. 3 is a sectional view of the apparatus showing that a cylinder has been moved in an axial direction of a housing with a certain distance.

FIG. 3 is a sectional view of the apparatus showing that the cylinder has been moved in an axial direction of the housing with a certain distance.

As shown, the cylinder 40 of which fixture to the housing 10 has been released is moved towards the opened end of the housing 10, and then is instantaneously stopped due to the contact with the jaw 33 of the clamping portion 30.

Herein, the pressurizing portion 41 of the cylinder 40 does not pressurize the jaw 33 any longer.

Figure 4:
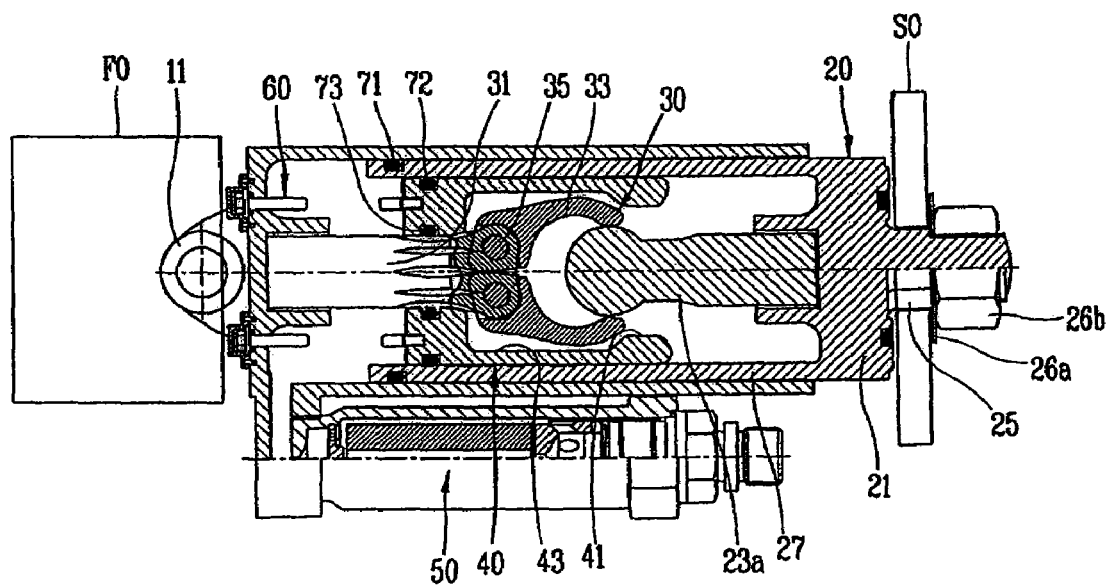
FIG. 4 is a sectional view of the apparatus showing that a clamped state of a coupling portion is released.

FIG. 4 is a sectional view of the apparatus showing that a clamped state of the coupling portion is released.

As shown, the cylinder 40 is moved with a certain distance as gas of a high pressure is continuously supplied from the gas generator 50 thereto. As the result, the releasing portion 43 of the cylinder 40 provides a space enough for the jaw 33 of the clamping portion 30 to be widened.

As the jaw 33 is rotated centering around the rotation pin 35 to be widened, a hooked state of the coupling rod 23 of the coupling portion 20 by the jaw 33 is released.

Figure 5:
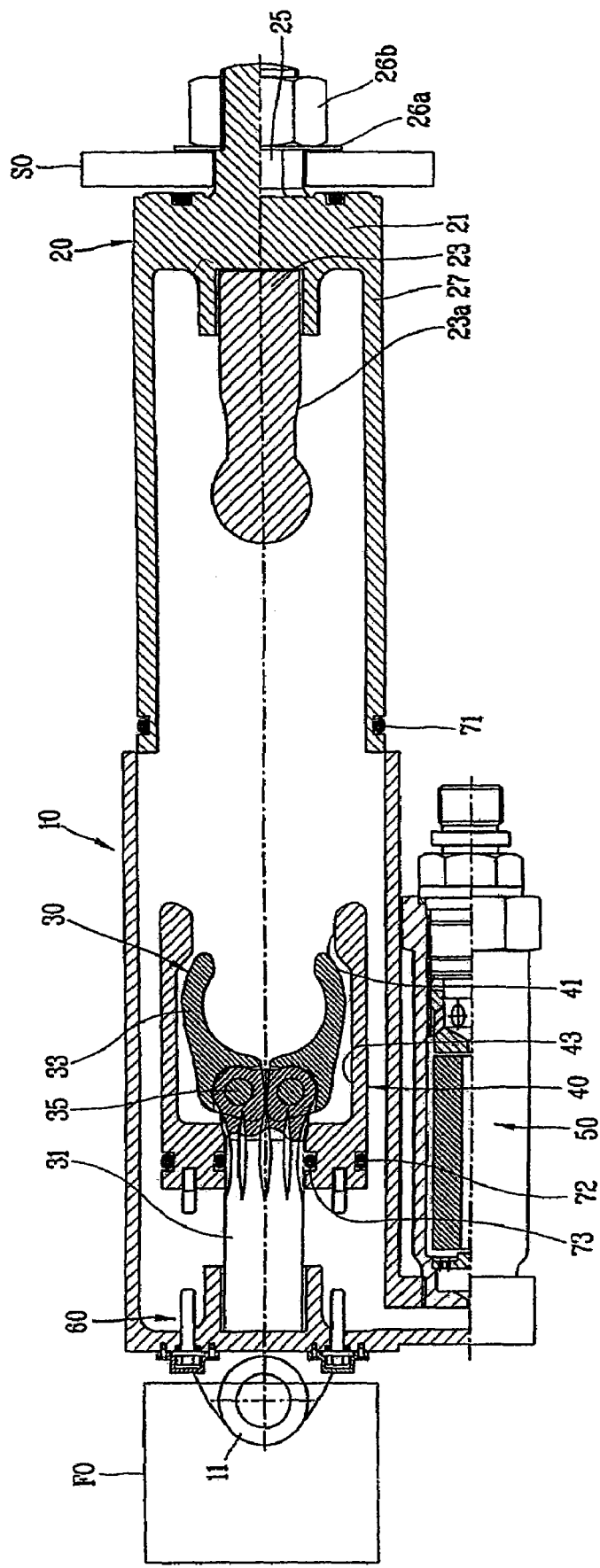
FIG. 5 is a sectional view of the apparatus showing that the coupling portion is completely separated from a housing.

FIG. 5 is a sectional view of the apparatus showing that the coupling portion is completely separated from the housing.

As shown, the coupling portion 20 receives a force towards the opened end of the housing 10 under a state that the fixed state to the clamping portion 30 is released. The gas of a high pressure emitted from the gas generator 50 is concentrated onto the coupling cylinder 27 of the coupling portion 20.

As the result, the coupling cylinder 27 is moved towards the opened end of the housing 10, and thus the coupling portion 20 is entirely moved.

At last, the coupling portion 20 is separated from the inner space of the housing 10 with a certain distance, and thus the first object connected to the housing 10 is separated from the second object connected to the coupling portion 20.

As aforementioned, in the apparatus for connecting and disconnecting two objects according to the present invention, the gas generator is integrally coupled to the housing thus to be interworked with the housing. Accordingly, an additional sealing space for the gas generator is not required, and thus a space efficiency is increased.

Furthermore, as the tension bolt requiring no electric control such as an explosive bolt is used in the present invention, two objects are separated from each other only by electrically controlling the gas generator and thus a complicated construction of the system due to a plurality of electric installations is solved. As the electric installations are decreased, a reliability of the apparatus is increased.

Besides, other components can be disassembled after disassembling the tension bolt in order to certify whether the inner components of the apparatus are mal-operated or not. Accordingly, the apparatus can be examined by a user's naked eyes without using a method such as a non-destructive test.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. An apparatus for connecting and disconnecting first and second objects, comprising:
a hollow housing having one closed end to which the first object is connectable and an opened end;
a coupling portion mounted in the housing so as to be movable in an axial direction of the housing, and to which the second object is connectable; a clamping portion coupled to the housing for clamping the coupling portion; a cylinder disposed in the housing for pressurizing the clamping portion so that a clamped state of the coupling portion by the clamping portion can be maintained;
wherein the clamping portion comprises:
a supporting rod coupled to the closed end of the housing and extending in an axial direction of the housing; and
a jaw rotatably connected to a free end of the supporting rod by a rotation pin for clamping the coupling portion;
a fixing portion coupled to the housing and the cylinder for fixing the cylinder to the housing so that the cylinder can maintain a pressurizing state onto the clamping portion, wherein the fixing portion is a tension bolt penetrating the closed end of the housing thus coupling to one side of the cylinder; and
a gas generator integrally coupled to an outer surface of the housing so as to be in communication with an inner space of the housing for generating gas of high pressure above a predetermined threshold thereby breaking the tension bolt, releasing a clamped state of the coupling portion, and separating the coupling portion from the opened end of the housing.

2. The apparatus of claim 1, further comprising a fixing portion coupled to the housing and the cylinder for fixing the cylinder to the housing so that the cylinder can maintain a pressurizing state onto the clamping portion.

3. The apparatus of claim 1 or 2, wherein the coupling portion comprises:
a coupling body to which the second object is connectable; and
a coupling rod coupled to the coupling body and having a coupling groove for locking the clamping portion at a free end thereof in a circumferential direction.

4. The apparatus of claim 3, further comprising a coupling cylinder including a cavity, the coupling cylinder extending from the coupling body so as to be positioned between the housing and the cylinder, for sealing a space between the cylinder and the housing.

5. The apparatus of claim 1, wherein the cylinder comprises:
a pressurizing portion a coupling rod and the jaw and protruding from an inner circumference of the cylinder, for pressurizing the jaw so that a clamped state of the coupling portion by the jaw can be maintained; and
a releasing portion forming the inner circumference of the cylinder and having a radius larger than a radius of the pressurizing portion, for releasing the clamped state of the coupling portion by the jaw when the cylinder moves to the opened end of the housing.

6. An apparatus for connecting and disconnecting first and second objects, comprising:

a hollow housing having one closed end to which the first object is connectable and an opened end;

a coupling portion mounted in the housing so as to be movable in an axial direction of the housing, and to which the second object is connectable;

a clamping portion coupled to the housing for clamping the coupling portion; a cylinder disposed in the housing for pressurizing the clamping portion so that a clamped state of the coupling portion by the clamping portion can be maintained;

a fixing portion coupled to the housing and the cylinder for fixing the cylinder to the housing so that the cylinder can maintain a pressurizing state onto the clamping portion, wherein the fixing portion is a tension bolt penetrating the closed end of the housing thus coupling to one side of the cylinder; and a gas generator integrally coupled to an outer surface of the housing so as to be in communication with an inner space of the housing for generating gas of high pressure above a predetermined threshold thereby breaking the tension bolt, releasing a clamped state of the coupling portion, and separating the coupling portion from the opened end of the housing.

* * * * *